Figure 1:
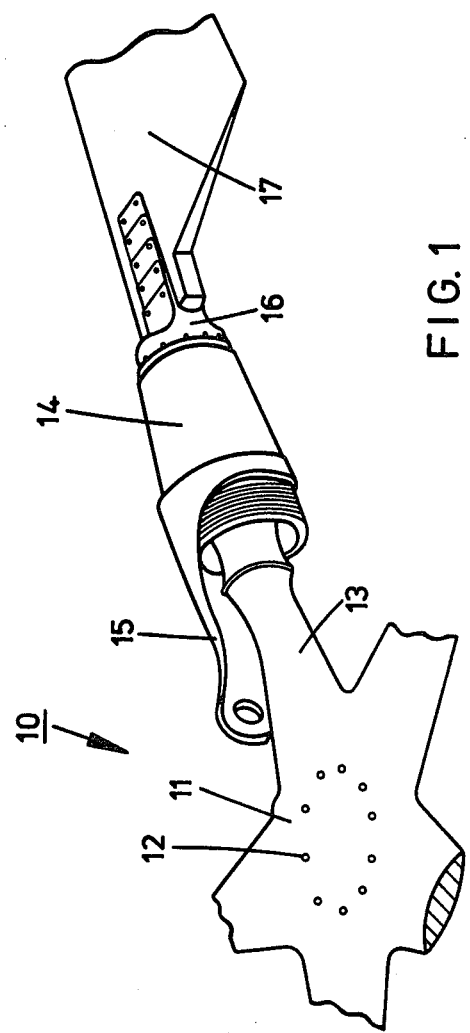

United States Patent [19]

Martin

[11] 4,099,892
[45] Jul. 11, 1978

[54] HELICOPTER ROTORS

[75] Inventor: Alfred Charles Martin, Shepton Mallet, England

[73] Assignee: Westland Aircraft Limited, Yeovil, England

[21] Appl. No.: 794,944

[22] Filed: May 9, 1977

[30] Foreign Application Priority Data

May 11, 1976 [GB] United Kingdom ............... 19446/76

[51] Int. Cl.² ............................................. B64C 27/38
[52] U.S. Cl. .................................. 416/134 A; 416/141
[58] Field of Search ............... 416/134 A, 138 A, 141, 416/102, 106, 140, 103, 107

[56] References Cited

U.S. PATENT DOCUMENTS

| | | | |
|---|---|---|---|
| 2,949,967 | 8/1960 | Jovanovich | 416/134 A |
| 3,026,942 | 3/1962 | Cresap | 416/138 A X |
| 3,231,222 | 1/1966 | Scheutzow | 416/134 A X |
| 3,297,094 | 1/1967 | Kisovec | 416/134 A X |
| 3,545,880 | 12/1970 | Mouille | 416/114 |
| 3,610,774 | 10/1971 | Mouille | 416/138 A X |
| 3,762,834 | 10/1973 | Bourquardez et al. | 416/134 A |
| 3,807,896 | 4/1974 | Johnson | 416/138 A X |
| 3,926,536 | 12/1975 | Ciastula et al. | 416/141 X |

*Primary Examiner*—Everette A. Powell, Jr.
*Attorney, Agent, or Firm*—Larson, Taylor and Hinds

[57] ABSTRACT

A helicopter rotor includes a rotor hub and a plurality of rotor blades, the rotor hub comprising, for each rotor blade, a flexure member extending generally radially from the hub and being flexible in a blade flap plane. A feathering hinge is located at an outer end of the flexure member and includes a cylindrical portion mounted on an extension of the flexure member and resilient means arranged to permit blade lead and lag movements of the cylindrical portion during operation. In a described embodiment, the cylindrical portion is mounted on axially spaced apart bearings comprising an inner part spherical bearing having a geometrical center and an outer parallel bearing, and a resilient elastomer ring is interposed between the outer bearing and the cylindrical portion so as to permit pivotal movement of the cylindrical portion about the geometrical center of the inner bearing.

7 Claims, 2 Drawing Figures

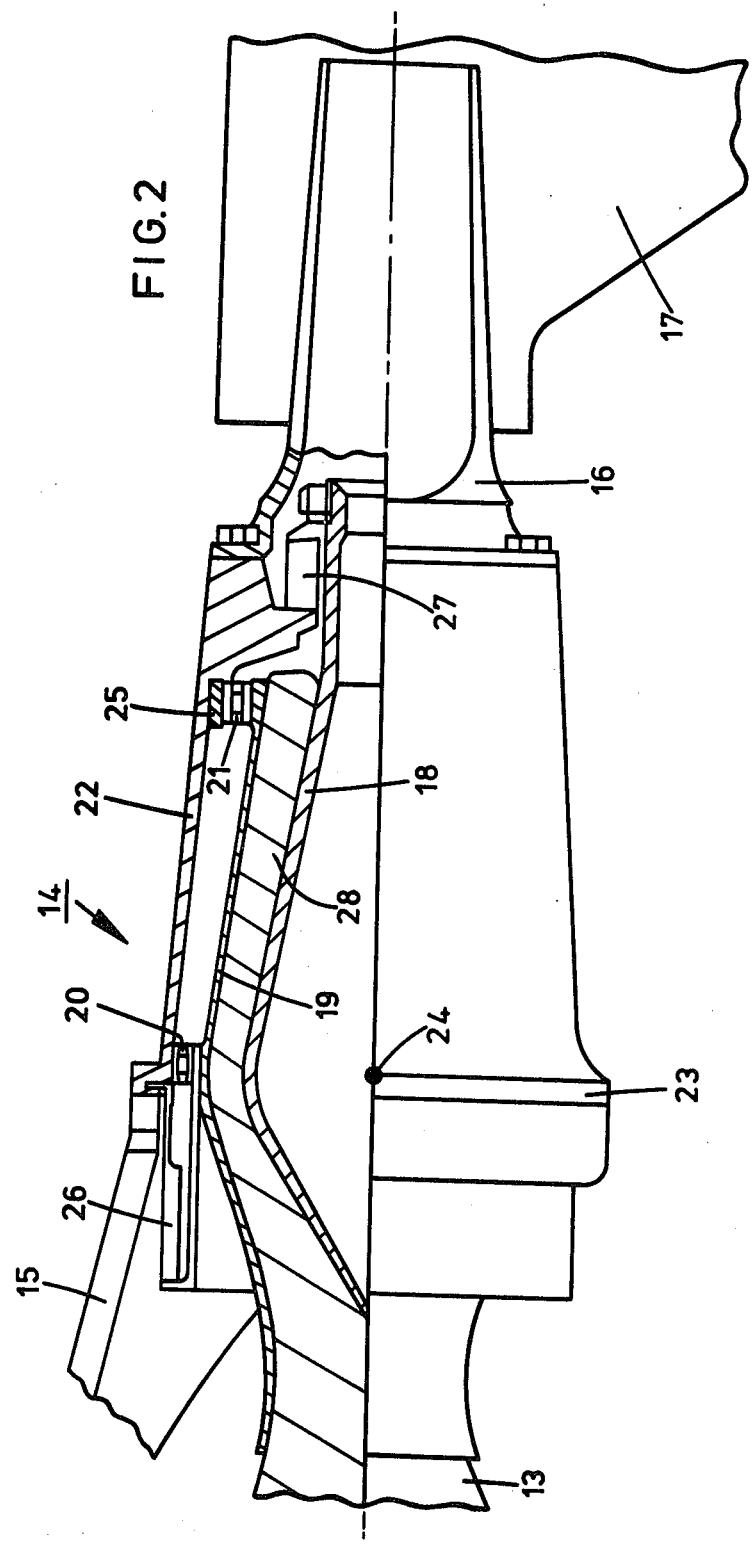

HELICOPTER ROTORS

This invention relates to helicopter rotors.

Articulated helicopter rotors utilise separate mechanical bearings to provide the necessary flap, lag and feathering movements of a rotor blade during operation. It has been proposed in the so-called semi-rigid rotor to replace the flap and lag bearings by one or more flexure elements of either metal or composite materials to reduce complexity and weight and improve the life of the rotor.

In general, in articulated rotors, a feathering hinge is located outboard of the flap and lag hinges so that only relatively small amounts of bending take place in the blade, and a resulting torsional moment produced by such bending is negligible. To ensure that the majority of blade bending occurs inboard of a feathering hinge on a semi-rigid rotor it would be necessary to position the hinge so far out along the blade as to give rise to control system problems and lack of aerodynamic cleanliness. Furthermore, the problems in designing a single flexure member to cater for both flap and lag movements are considerable because of the different operating frequencies required in each plane.

Consequently, semi-rigid rotors have generally comprized an arrangement in which the majority, if not all, blade bending occurs outboard of a feathering hinge which means that the blade is of low torsional stiffness and is particularly susceptible to blade bending/torsion coupling that occurs when the blade bends away from the line of the feathering axis, resulting in stability problems.

A semi-rigid rotor construction that overcomes this problem is disclosed in our U.S.A. Patent Specification Serial No. 3,926,536, which teaches a rotor having a feathering hinge located sufficiently far outboard of a blade flap flexure member to ensure that the axis of the hinge follows reasonably closely the bending of the blade. An outer flexure member accommodates the majority of blade lag movements, and is of matched stiffness in the flap and lag planes throughout the area immediately outboard of the feathering hinge in which torsional moments are normally high.

This results in a rotor in which the desired flap and lag frequencies are obtained independently and in which the bending/torsion coupling is significantly reduced.

However, the combined overall length of the inboard and outboard flexure members in this rotor may present a problem of high drag loads during operation.

Accordingly, the present invention provides a helicopter rotor including a rotor hub and a plurality of rotor blades, the rotor hub comprizing, for each rotor blade, a flexure member extending generally radially from the hub and being flexible in a blade flap plane, a feathering hinge located at an outer end of the flexure member and including a generally cylindrical portion rotatably mounted on an extension of the flexure member, and resilient means arranged to permit rotor blade lead and lag movements of said cylindrical portion during operation.

In one embodiment of the invention, the cylindrical portion is mounted on axially spaced-apart inner and outer bearings comprising an inner part-spherical roller bearing having a geometrical centre and an outer parallel roller bearing, said resilient means being associated with said outer bearing so as to permit generally universal pivotal movement of the outer end of the cylindrical portion about the centre of the inner bearing.

The resilient means may comprize a ring of suitable material, for example elastomer, and may be located between an outside diameter of the bearing and an inside diameter of the cylindrical portion.

In one form of the invention, the hub and flexure members may comprize an integral structure manufactured of fibre-reinforced plastics material, and the extension may be generally tubular in cross-section. Preferably, said tubular section is flared first outwardly then inwardly with respect to its longitudinal axis, and metal sleeves are bonded to inner and outer surfaces thereof.

A thrust bearing, separate from the bearing(s) providing feathering movements, may be provided in the feathering hinge to relieve the feathering bearing(s) of centrifugal loads during operation. In the preferred embodiment, the thrust bearing conveniently comprizes an elastomeric bearing located between an outer end of the said inner metal sleeve and the said cylindrical portion outboard of the outer feathering hinge bearing.

A lubricant seal, preferably an elastomeric seal, may be provided between the outer sleeve and the cylindrical portion inboard of the inner bearing.

The invention will now be described by way of example only and with reference to the accompanying drawings, in which:-

FIG. 1 is a fragmentary perspective view of a helicopter rotor constructed in accordance with the invention; and FIG. 2 is a fragmentary sectioned plan view of the rotor of FIG. 1.

Referring now to FIG. 1, a helicopter rotor generally indicated at 10 consists of a rotor hub 11 having a ring of holes 12 that accommodate bolts for attachment of the rotor to a generally vertical rotor drive shaft (not shown).

The rotor hub 11 is an integral structure manufactured of fibre-reinforced plastics material and includes five radially extending flexure members 13 tapering from a generally flattened oval cross-sectional shape to a generally circular outer end and accommodating flapping movements of an associated rotor blade during operation.

A feathering hinge 14 is located at an outer end of each flexure member 13, each feathering hinge 14 having an associated pitch control arm 15 attached thereto through which rotor blade pitch change movements are provided during operation. An outwardly facing surface of each feathering hinge 14 is provided with a ring of bolt holes accommodating bolts attaching a blade cuff 16 secured to a rotor blade 17.

From FIG. 2 it will be seen that the outer end of each member 13 has an extension 28 that is tubular in cross-section and is flared first outwardly, then inwardly with respect to its longitudinal axis. Tubular inner and outer metal sleeves 18 and 19 respectively are shaped and bonded to inner and outer surfaces of the extension 28, the arrangement providing a wedge-type attachment capable of withstanding centrifugal loads experienced during operation.

The outer sleeve 19 supports axially spaced-apart roller bearings 20 and 21 which in turn support an outer cylindrical portion 22 thereby constituting the feathering hinge 14. The pitch control arm 15 is attached to the cylindrical portion 22 by bolting to a circumferential flange 23.

Inner roller bearing 20 comprizes a part spherical bearing having a geometrical centre 24. Outer roller bearing 21 comprises a parallel roller bearing. A resilient elastomer ring 25 is interposed between an outside surface of the bearing 21 and an inside surface of the cylindrical portion 22.

An elastomeric seal 26 is located at an inner end of the feathering hinge 14 and extends between the outer sleeve 19 and the cylindrical portion 22, and an elastomeric thrust bearing 27 is located at an outer end of the feathering hinge 14 between an extension of the inner sleeve 18 and the cylindrical portion 22. The seal and thrust bearing 26 and 27 respectively serve to provide efficient lubricant seals at each end of the feathering hinge 14 to retain a lubricant whilst permitting rotation of the feathering hinge, thereby reducing servicing and maintenance requirements. Additionally, the thrust bearing 27 transmits centrifugal loads, encountered during operation, from the blade to the hub and relieves the bearings 20 and 21 of these loads.

In operation, the helicopter rotor of the present invention retains the advantages of the rotor disclosed in our said prior specification by dispensing with mechanical hinges for rotor blade flap and lead-lag movements, and by locating the feathering hinge outboard of a flap flexure member. However, in the present rotor, the blade lead-lag movements are accommodated in an area generally coincidental with the feathering hinge 14 by virtue of the outer cylindrical portion 22, that in effect forms a rigid extension of the rotor blade 17, overlapping the feathering hinge bearings 20 and 21. Lead-lag movements of the rotor blade 17 are accommodated by the resilient elastomer ring 25 which permits pivotal movement of the cylindrical portion 22, and therefore the blade 17, about the geometrical centre 24 of the inner part-spherical bearing 20. This means that the axis of the feathering hinge 14 follows bending movements of the blade 17 more closely than in the rotor in our said prior specification. Furthermore, by avoiding the use of a flexure member outboard of the feathering hinge, the overall size of the present rotor hub is reduced, thereby significantly reducing drag loads during operation as compared with the said prior rotor.

In the illustrated embodiment, the elastomer ring 25 is of uniform size and properties throughout its length so that the matched stiffness concept of our said prior rotor is retained.

The elastomeric seal 26 and elastomeric thrust bearing 27 provide efficient lubricant seals so that the bearings 20 and 21 can be grease lubricated and sealed for life to further reduce servicing and maintenance requirements.

As an example only, for a helicopter of approximately 13,500 lbs. gross weight, a five-bladed rotor constructed as above described and illustrated would have an elastomer ring 25 with an outside diameter of 9.0 inches, a thickness of 0.5 inches, and a length of 2.75 inches, to provide ± 3° of movement of the rotor blade 17 about the centre 24 of the inner bearing 20.

It should be understood that various modifications can be made in the described rotor without departing from the scope of the appended claims. For example, it may be aerodynamically desirable in certain installations to provide a rotor in which the stiffness in the flap and lag planes are not matched. This may readily be accomplished in the present arrangement by selective variation of the properties in different regions of the elastomer ring 25, for example by manufacturing the ring 25 so that, in a radial direction, it has different thicknesses in different radial planes. For example, the ring 25 may have a generally elliptical outside surface to mate with an appropriately shaped inside surface in the cylindrical portion 22, and a circular central hole for location on the bearing 21. Alternatively, the resilient means may comprise a plurality of blocks of suitable material suitably related to the flap and lead-lag planes and providing desired stiffness characteristics in each such plane. The hub 11 and flexure members 13 may comprise an integral metal structure, for example formed in titanium, in which case the bearings 20 and 21 may be mounted on a spindle-like extension formed integral with the hub. Moreover, the resilient means, such as the elastomer ring 25, may be located between an inside surface of the bearing 21 and an outside surface of the outer sleeve 19. The inner part-spherical roller bearing may be replaced by a suitable part-spherical elastomeric bearing having a geometrical centre and, in such an arrangement, a surface-to-surface dry bearing may be fitted in place of the outer roller bearing, thereby dispensing with the need for lubricating the roller bearings to simplify the construction and further reduce servicing and maintenance requirements.

I claim as my invention:

1. A helicopter rotor including a rotor hub and a plurality of rotor blades, the rotor hub comprising, for each rotor blade, a flexure member extending generally radially from the hub and being flexible in a blade flap plane, a feathering hinge located at an outer end of the flexure member and including a generally cylindrical portion rotatably mounted on axially spaced-apart inner and outer bearings on an extension of the flexure member, said inner bearing comprising a part-spherical bearing having a geometrical center, and resilient means associated with said outer bearing and arranged so as to permit, during operation, blade lead and lag movements of said cylindrical portion about the center of the inner bearing.

2. A helicopter rotor as claimed in claim 1, wherein said resilient means comprizes an elastomer ring.

3. A helicopter rotor as claimed in claim 2, wherein said elastomer ring is interposed between an outside surface of the bearing and an inside surface of the cylindrical portion.

4. A helicopter rotor as claimed in claim 1, wherein the flexure member is constructed of fibre-reinforced plastics material.

5. A helicopter rotor as claimed in claim 4, wherein said outer end of the flexure member is tubular in cross-section and is flared first outwardly then inwardly with respect to its longitudinal axis.

6. A helicopter rotor as claimed in claim 5, wherein metal sleeves are bonded to inner and outer surfaces of the extension.

7. A helicopter rotor as claimed in claim 6, wherein a thrust bearing is located between an outer extension of the inner sleeve and the cylindrical portion of the feathering hinge.

* * * * *